United States Patent
Kinman (12)

(10) Patent No.: US 6,320,569 B1
(45) Date of Patent: Nov. 20, 2001

(54) MINIATURE TRACK BALL POINTER WITH BUILT-IN SELECTOR

(75) Inventor: David Kinman, San Diego, CA (US)

(73) Assignees: Sony Corporation, Tokyo (JP); Sony Electronics Inc., Parkridge, NJ (US)

(*) Notice: Subject to any disclaimer, the term of this patent is extended or adjusted under 35 U.S.C. 154(b) by 0 days.

(21) Appl. No.: 09/287,467

(22) Filed: Apr. 7, 1999

(51) Int. Cl.[7] ............................................. G09G 5/08
(52) U.S. Cl. ............................................. 345/167
(58) Field of Search ................................. 345/156, 157, 345/163, 164, 165, 166, 167; 463/30, 37, 38

(56) References Cited

U.S. PATENT DOCUMENTS

| | | |
|---|---|---|
| 5,208,736 | 5/1993 | Crooks et al. . |
| 5,237,311 * | 8/1993 | Mailey et al. ................ 345/167 |
| 5,504,502 | 4/1996 | Arita et al. . |
| 5,526,481 | 6/1996 | Parks et al. . |
| 5,543,588 | 8/1996 | Bisset et al. . |
| 5,563,631 | 10/1996 | Masunaga . |
| 5,565,891 * | 10/1996 | Armstrong ................ 345/167 |
| 5,691,747 | 11/1997 | Amano . |
| 5,719,799 | 2/1998 | Isashi . |

* cited by examiner

Primary Examiner—Chanh Nguyen
(74) Attorney, Agent, or Firm—Jay H. Maioli

(57) ABSTRACT

A miniature trackball pointer device includes a ball-shaped roller portion protruding from an opening in an upper surface of the device. When a user rolls the roller portion to move a pointer displayed on a display screen, at least one of a pair of x and y encoders or movement sensors is contacted, and the movement of the roller portion is converted into electrical signals used to move the pointer on the display screen. A resilient layer supports the roller portion above a lower surface of the pointer. A pressure-activated selector switch is located on the lower surface of the pointer directly below the roller portion such that when the user presses down on the roller portion the resilient layer flexes to enable the roller portion to press, and thus activate, the selector switch via the resilient layer.

8 Claims, 3 Drawing Sheets

MINIATURE TRACK BALL POINTER WITH BUILT-IN SELECTOR

BACKGROUND

The present invention relates to a miniature pointing device for use with portable electronic apparatus, such as notebook computers, hand-held electronic games, so-called "personal digital assistants" (PDAs), and the like. More particularly, the present invention relates to a miniature track ball pointing device with a built-in selector for pointing to and selecting an object displayed on a display screen.

It is now commonplace for a personal computer to include a pointing device for selecting objects and manipulating data. Generally, the pointing device moves a pointer around a display screen, and one or more buttons are activated to select an object being pointed to or to move a cursor to the location of the pointer. A number of different pointing devices have been developed to date, including touch pads, magnetic tablets, trackballs, and mice.

A touch pad is a pressure-sensitive pointing device having a two-dimensional array of pressure sensors, with each sensor corresponding to a coordinate position on a display screen. A finger is dragged across the array of sensors, and the direction of movement of the finger moves a pointer on the display screen in that direction. A button selector is pressed to select an object being pointed to by the pointer or to move a cursor displayed on the display screen to the location of the pointer. Optionally, a pressure-sensitive selector located below the two-dimensional array of pressure sensors may be used, wherein the pressure-sensitive selector is activated when it is tapped at a pressure above a predetermined value greater than the pressure sensed by the two-dimensional array of pressure sensors.

A problem with the use of touch pads is that users may not have a sufficiently delicate finger control which is required to move the pointer without overshooting the desired pointer position. User frustration can result from repeated attempts to position a pointer caused by clumsy fingers. Similarly, a problem with the use of a pressure-sensitive selector is that tapping with inadequate pressure will fail to activate the selector but instead will likely lead to inadvertent movement of the pointer, thus causing user frustration at having to re-position the pointer.

A magnetic tablet is similar to a touch pad but uses magnetic sensors instead of pressure-sensitive sensors. A pen having a magnetic tip is dragged across the tablet, and the direction of movement of the pen moves a pointer in that direction. A button selector is pressed to select an object being pointed to by the pointer or to move a cursor to the location of the pointer.

A problem with the use of magnetic tablets is that they require the use of a magnetic pen which can be sensed by the magnetic sensors. Thus, a user must move his fingers away from a keyboard area in order to manually grasp and move the pen to activate the magnetic sensors, which is a slow and often annoying way to point at an object on a display screen because of all the hand movement involved.

A mouse is the most common of the known pointing devices and converts electrical data derived from movement of the mouse on a surface to vector movements of a pointer displayed on a display screen. A mouse generally includes a ball-shaped roller protruding from its lower surface such that when a user grasps the mouse and drags it along a table top the roller rolls and engages x and y movement sensors. The sensors, in turn, convert the roller's movement into electrical signals for moving the pointer on the display screen. A button is incorporated on an upper surface of the mouse for use as a selector.

A problem with the use of mice is that they require a table top or the like for dragging the roller to move the pointer. Thus, mice generally are not well suited for use with compact portable electronic apparatus where table tops are not always available. Additionally, a user must move his hand away from a keyboard area, for example, in order to use a mouse, thus requiring the user go through several hand and arm motions.

A trackball is similar to a mouse but has a ball-shaped roller protruding from its top surface. A user rolls the roller with his finger in order to move a pointer on a display screen. A button positioned near the ball is used as a selector.

A disadvantage to using trackballs for compact portable electronic apparatus is that both a roller and a separate selector button must be accommodated on the apparatus, thus enlarging the size of the apparatus.

OBJECTS AND SUMMARY OF THE INVENTION

In view of the above-mentioned deficiencies in existing pointing devices, it is an object of the present invention to provide a miniature trackball pointing device with a built-in selector for use in compact portable electronic apparatus.

According to an aspect of the present invention, a miniature trackball pointer device includes a ball-shaped roller portion protruding from an opening in an upper surface of the device. When a user rolls the roller portion to move a pointer displayed on a display screen, at least one of a pair of x and y encoders or movement sensors is contacted, and the movement of the roller portion is converted into electrical signals used to move the pointer on the display screen. A resilient layer supports the roller portion above a lower surface of the pointer. A pressure-activated selector switch is located on the lower surface of the pointer directly below the roller portion such that when the user presses down on the roller portion the resilient layer flexes to enable the roller portion to press, and thus activate, the selector switch via the resilient layer.

The miniature trackball pointer device of the present invention is ideally suited for compact portable electronic devices because it does not require a separate surface for support. Additionally, because the miniature trackball pointer device may be located near the resting position of a user's hand, such as adjacent a keyboard area, and does not require additional space for selector buttons, it is also ideally suited for hand-held electronic devices such as so-called "personal digital assistants" or PDAs. The miniature trackball pointer device is smaller than known touch pad pointing devices because no additional surface area is required for use as a "dragging" area.

DETAILED DESCRIPTION OF PREFERRED EMBODIMENTS

Figure 1:
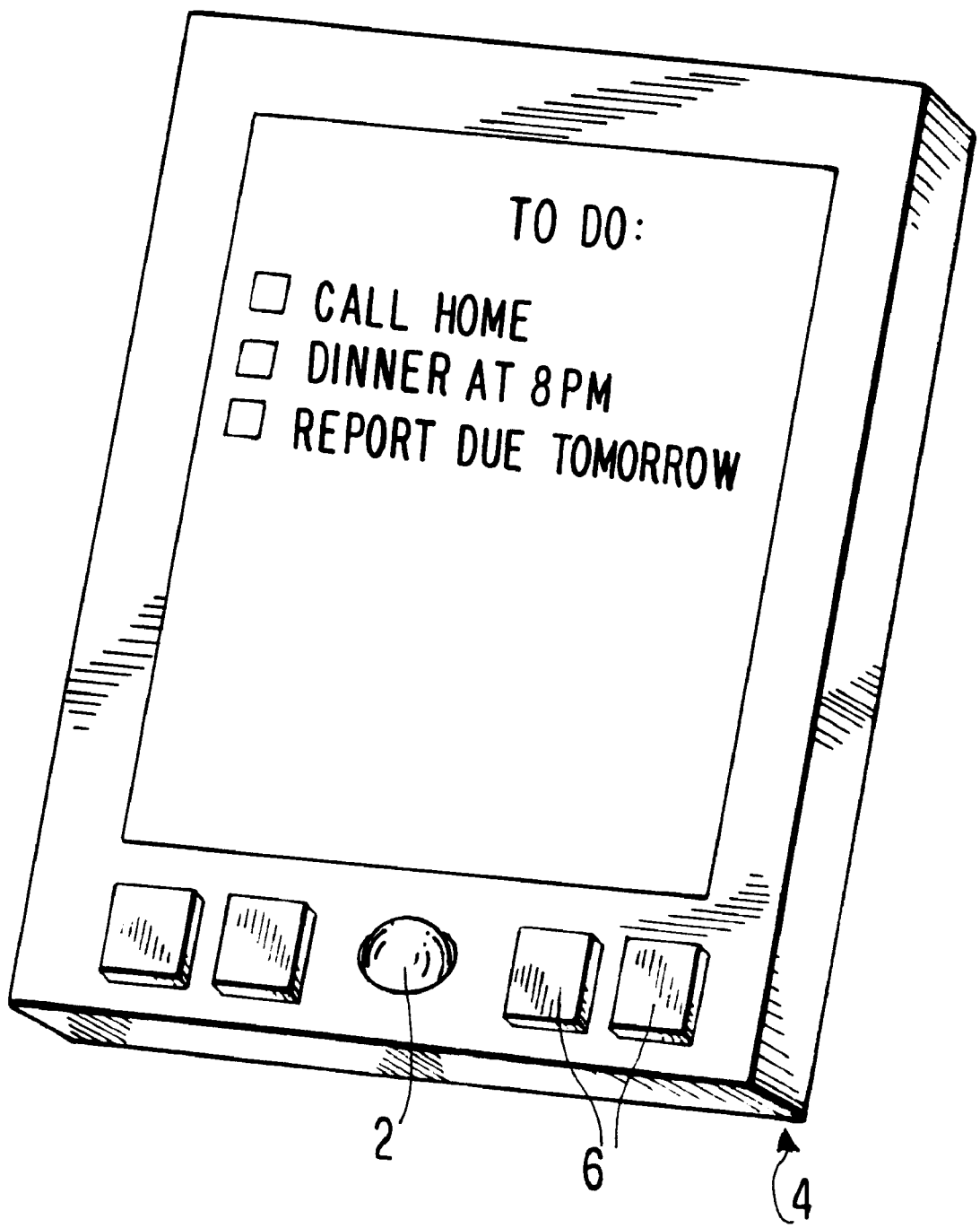
FIG. 1 schematically shows a miniature trackball pointer device incorporated into a personal digital assistant.

Preferred embodiments of a miniature trackball pointer with built-in selector according to the present invention are described below with reference to the accompanying drawings, in which like reference numerals represent the same or similar elements.

FIG. 1 schematically shows a miniature trackball pointer device 2 incorporated into a personal digital assistant (PDA) 4. The pointer device 2 is sufficiently small to be the size of one of the buttons 6 located at a lower end of the PDA 4. In use, a user grasps the PDA 4 with one hand and manipulates the buttons 6 and the pointer device 2 with the other hand. Only one finger is needed to manipulate the pointer device 2 and make a selection.

Figure 2:
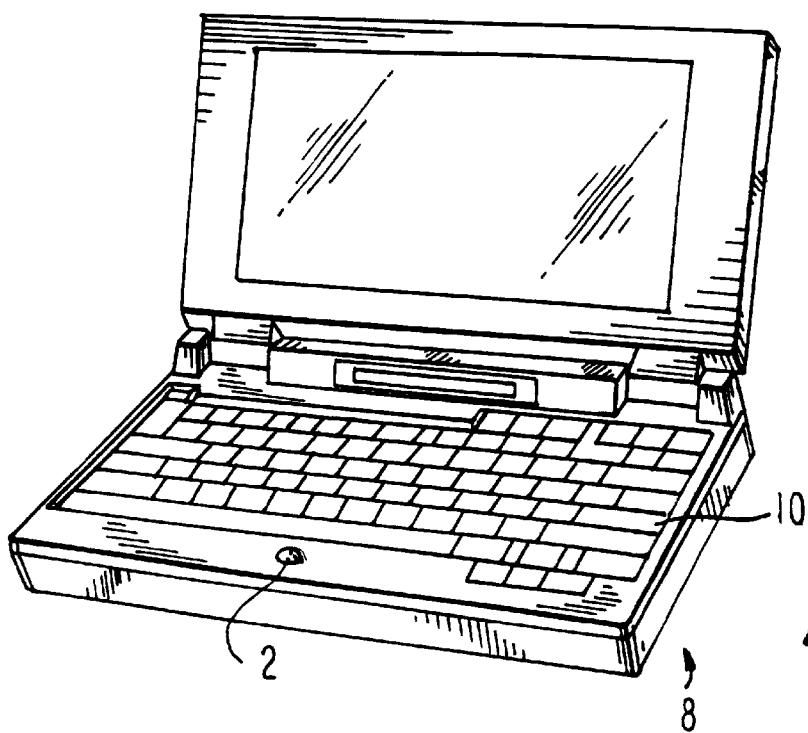
FIG. 2 schematically shows a miniature trackball pointer device incorporated into a sub-compact computer.
Figure 3:
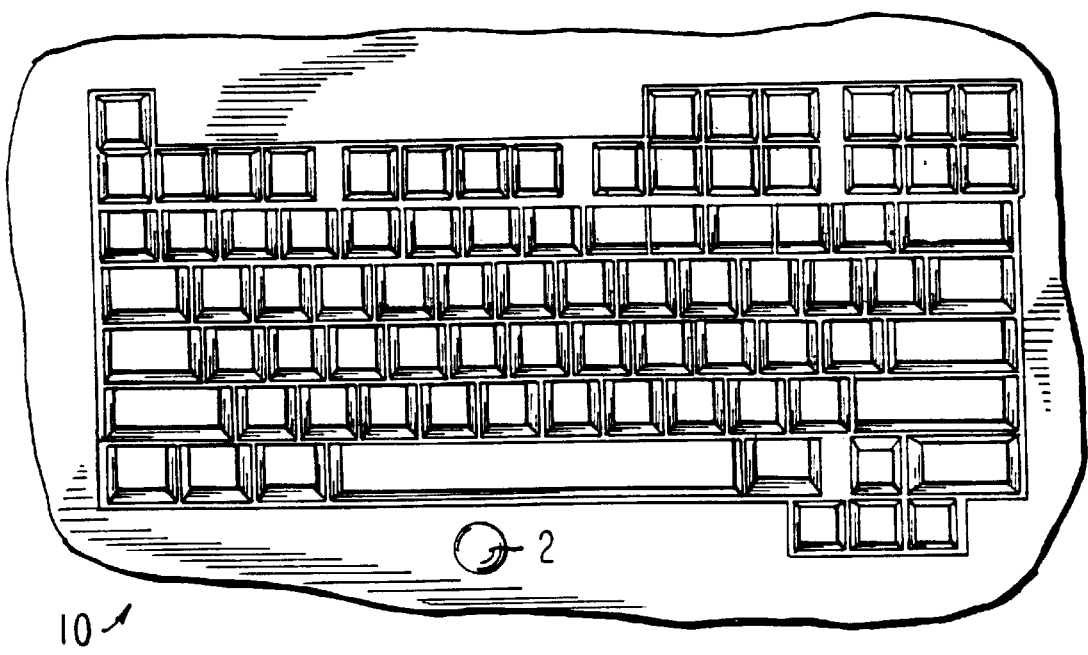
FIG. 3 schematically shows a plan view of the miniature trackball pointer device of FIG. 2.

FIG. 2 schematically shows a miniature trackball pointer device 2 incorporated into a sub-compact computer 8. As shown more clearly in FIG. 3, the pointer device 2 is located adjacent a keyboard area 10 of the computer 8 such that the user only needs to slightly tilt or pivot his wrist in order to use the pointer device 2. Therefore, the user can easily maintain his hand position relative to the keyboard area 10 when using the pointer device 2.

Figure 4:
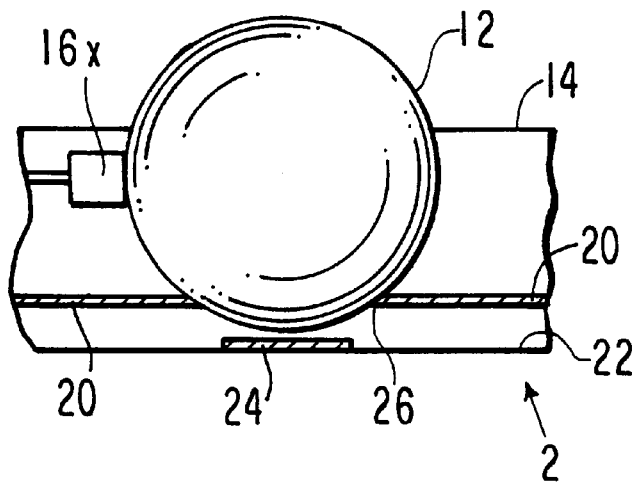
FIG. 4 schematically shows a cross section of a miniature trackball pointer device according to an embodiment of the present invention.

FIG. 4 is a cross-sectional schematic view of the pointer device 2 according to an embodiment of the present invention. A ball-shaped roller portion 12 protrudes from an opening in an upper surface 14 of the pointer device 2. When the roller portion 12 is rolled, its movement is translated by a pair of x and y encoders 16x, 16y, or movement sensors, into movement of a pointer displayed on a display screen (not shown).

A resilient layer 20 supports the roller portion 12 above a lower surface 22 of the pointer device 2. A pressure-activated selector switch 24 is located on the lower surface 22 directly below the roller portion 12 such that when the user presses down on the roller portion 12 with a force exceeding a predetermined minimum force, the resilient layer 20 flexes to enable the roller portion 12 to press, and thus activate, the selector switch 24. When the user releases the roller portion 12, the resilient layer 20 returns to its natural position parallel to the lower surface 22.

Figure 5:
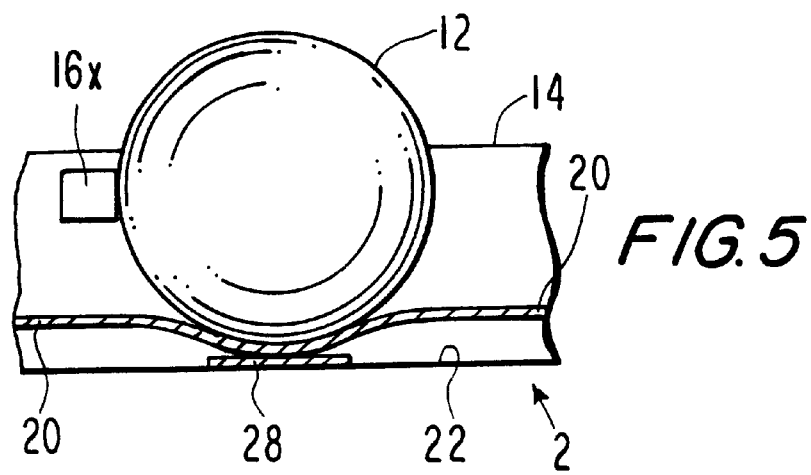
FIG. 5 schematically shows a cross section a miniature trackball pointer device according to another embodiment of the present invention.

Although FIG. 4 shows an opening 26 in the resilient layer 20 to accommodate the roller portion 12, the opening 26 is not necessary for proper operation of the selector switch 24. That is, the roller portion 12 may be supported by a continuous resilient layer 20 which flexes to contact the selector switch 28 when the roller portion 12 is pressed down with a force exceeding the predetermined minimum force, as shown in FIG. 5. The selector switch 28 need not be a pressure-sensitive switch but instead may be an electrical switch which is activated when electrical contact is made between the selector switch 28 and an electrical contact portion (not shown) located on the resilient layer 28 opposite the selector switch 28.

Figure 6:
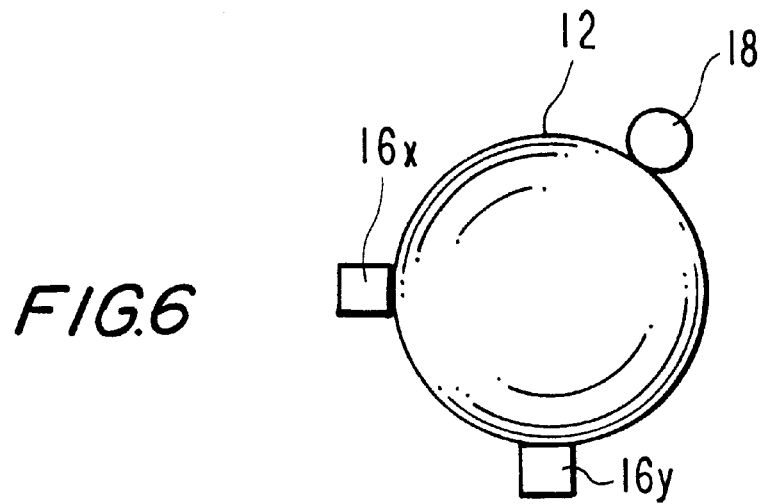
FIG. 6 schematically shows a partial view of a miniature trackball pointer device according to an embodiment of the present invention.

FIG. 6 is a top partial view of the pointer device 2 showing the pair of x and y encoders 16x, 16y. A bias portion 18 biases the x and y encoders 16x, 16y such that when the roller portion 12 is rolled at least one of the x and y encoders 16x, 16y is being contacted. The movement of the roller portion 12 is converted by the x and y encoders 16x, 16y into electrical signals used in moving the pointer on the display screen (not shown).

In operation, the user uses his finger to roll the roller portion 12 in a direction in which he wants the pointer on the display screen (not shown) to move. The roller portion 12 contacts at least one of the pair of x and y encoders 16x, 16y which convert the rolling movement of the roller portion 12 into electrical signals used to move the pointer. When the user wants to select an object being pointed to by the pointer, he presses down on the roller portion 12 with sufficient force to flex the resilient layer 20 so that the pressure-sensitive selector switch 24 is activated. When the user releases the selector switch 24, the resilient layer 20 returns to its natural shape supporting the roller portion 12 above the selector switch 24.

Optionally, the resilient layer 20 may be textured to provide a slight frictional force on the roller portion 12 to prevent unwanted slippage of the roller portion 12 should the electronic apparatus incorporating the pointer device 2 be accidentally bumped.

The embodiments described above are illustrative examples of the present invention and it should not be construed that the present invention is limited to those particular embodiments. Various changes and modifications may be effected by one skilled in the art without departing from the spirit or scope of the invention as defined in the appended claims.

What is claimed is:

1. A pointer device for a compact portable apparatus, the pointer device comprising:

a spherical roller portion protruding from an opening in an upper surface of the pointer device for causing a pointer on a display screen to move;

a pair of x and y encoders contacting the roller portion for converting a rolling motion of the roller portion into electrical signals for moving the pointer on the display screen;

a resilient layer in direct contact with the roller portion for supporting the roller portion above a lower surface of the pointer device, whereby the roller portion does not require a separate surface for support; and a selector switch located on the lower surface of the pointer device and positioned beneath the roller portion, for selecting an object being pointed to by the pointer on the display screen, wherein when a user presses on the roller portion with a force exceeding a predetermined minimum force the resilient layer flexes to enable the roller portion to contact the selector switch to activate the selector switch.

2. The pointer device according to claim 1, wherein the selector switch is a pressure-sensitive switch which is activated when contacted with a force exceeding a predetermined amount of force.

3. The pointer device according to claim 1, wherein when the user releases the roller portion the resilient layer returns to its natural position parallel to the lower surface of the pointer device.

4. The pointer device according to claim 1, wherein the resilient layer is interposed between the roller portion and the selector switch when the roller portion contacts the selector switch.

5. The pointer device according to claim 1, further comprising a bias portion for biasing the roller portion against the pair of x and y encoders.

6. The pointer device according to claim 1, wherein the selector switch is an electrical switch which is activated when electrical contact is made between the selector switch and an electrical contact portion located on the resilient layer opposite the selector switch.

7. A method of selecting an object being pointed to by a pointer on a display screen, the method comprising the steps of:

rolling a spherical roller portion with one or more fingers;

converting the rolling movement of the roller portion into electrical signals used for moving the pointer on the display screen;

moving the pointer on the display screen to point at a desired object; and using a finger to apply a force exceeding a predetermined minimum force to the roller portion to flex a resilient layer in direct contact with the roller portion that supports the roller portion, whereby the roller portion does not require a separate surface for support, and cause the roller portion to activate a selector switch located adjacent the roller portion to select the desired object.

8. The pointer device according to claim 1, wherein the resilient layer is textured to provide a frictional force to the roller portion to prevent slippage of the roller portion.

* * * * *